(12) United States Patent
Duch

(10) Patent No.: US 11,873,904 B2
(45) Date of Patent: Jan. 16, 2024

(54) SEALING DEVICE FOR BEARING UNIT

(71) Applicant: AKTIEBOLAGET SKF, Gothenburg (SE)

(72) Inventor: Daniele Duch, San Gillio (IT)

(73) Assignee: AKTIEBOLAGET SKF

(*) Notice: Subject to any disclaimer, the term of this patent is extended or adjusted under 35 U.S.C. 154(b) by 192 days.

(21) Appl. No.: 17/492,874

(22) Filed: Oct. 4, 2021

(65) Prior Publication Data
US 2022/0112958 A1   Apr. 14, 2022

(30) Foreign Application Priority Data
Oct. 9, 2020   (IT) .......................... 102020000023791

(51) Int. Cl.
| | |
|---|---|
| *F16C 33/78* | (2006.01) |
| *F16C 33/80* | (2006.01) |
| *F16J 15/453* | (2006.01) |
| *F16C 19/14* | (2006.01) |
| *F16J 15/3232* | (2016.01) |
| *F16J 15/324* | (2016.01) |

(52) U.S. Cl.
CPC ............. *F16J 15/453* (2013.01); *F16C 19/14* (2013.01); *F16C 33/782* (2013.01); *F16C 33/7876* (2013.01); *F16C 33/80* (2013.01); *F16J 15/324* (2013.01); *F16J 15/3232* (2013.01); *F16C 2326/02* (2013.01)

(58) Field of Classification Search
CPC ...... F16C 19/14; F16C 19/186; F16C 33/782; F16C 33/7876; F16C 33/7879; F16C 33/7883; F16C 33/80; F16C 2326/02; F16J 15/3232; F16J 15/324; F16J 15/453; B60B 27/0073
See application file for complete search history.

(56) References Cited

U.S. PATENT DOCUMENTS

| | | | |
|---|---|---|---|
| 2009/0257698 A1 | 10/2009 | Aritake et al. | |
| 2012/0177315 A1 | 7/2012 | Matsuki et al. | |
| 2016/0023512 A1* | 1/2016 | Duch ................. | B60B 27/0073 301/110 |
| 2016/0131257 A1* | 5/2016 | Sakai ................... | F16J 15/3232 277/351 |

(Continued)

FOREIGN PATENT DOCUMENTS

| | | | | |
|---|---|---|---|---|
| DE | 102018103109 | | 8/2019 | |
| DE | 102018103109 A1 * | | 8/2019 | ......... B60B 27/0073 |

(Continued)

OTHER PUBLICATIONS

Search Report for corresponding Italian Patent Application No. 102020000023791 dated Jun. 9, 2021.

*Primary Examiner* — Phillip A Johnson
(74) *Attorney, Agent, or Firm* — Reed Smith LLP

(57) ABSTRACT

A sealing device for a bearing unit, having a stationary part, which is in turn provided with a first metal screen, an elastomer coating co-moulded on to the first screen, and a radially inner contact lip belonging to the elastomer coating, and a rotatable part provided with a second metal screen with which the contact lip makes a sliding contact, the sealing device being provided with at least one appendage which faces a radially inner flanged ring of the bearing unit and interacts with this flanged ring to form a barrier against the entry of contaminants.

10 Claims, 4 Drawing Sheets

(56) References Cited

U.S. PATENT DOCUMENTS

2018/0080563 A1   3/2018  Shuto et al.
2018/0186181 A1*  7/2018  Tada ..................... F16C 19/186
2018/0195558 A1*  7/2018  Kato ................... F16J 15/3264

FOREIGN PATENT DOCUMENTS

| | | |
|---|---|---|
| DE | 202019102992 | 9/2019 |
| DE | 202019106058 | 3/2020 |
| JP | 6526387 | 11/2015 |
| JP | 2015212561 | 11/2015 |
| JP | 2016133155 | 7/2016 |
| JP | 2016205459 | 12/2016 |

* cited by examiner

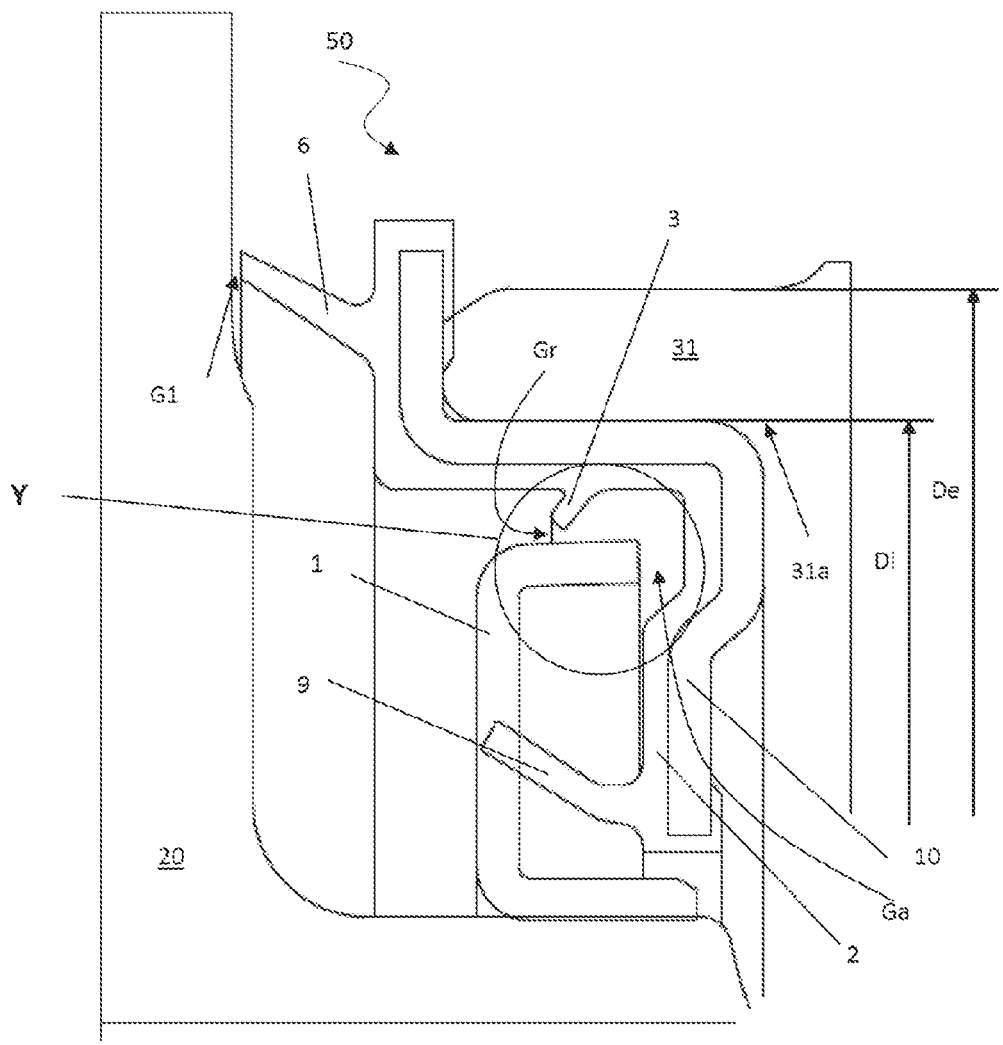
Fig. 2a
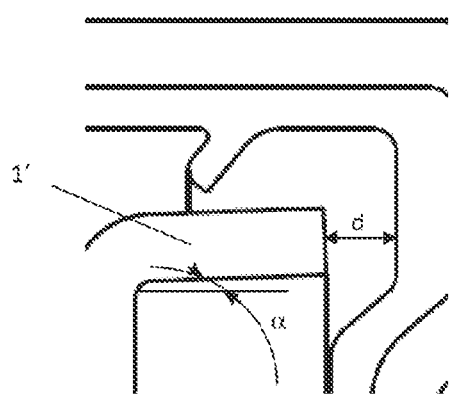
Fig. 2b – Detail Y

SEALING DEVICE FOR BEARING UNIT

CROSS-REFERENCE RELATED APPLICATIONS

This application is based on and claims priority to Italian Patent Application No. 102020000023791 filed on Oct. 9, 2020, under 35 U.S.C. § 119, the disclosure of which is incorporated by reference herein.

TECHNICAL FIELD

The present application relates to a sealing device for a bearing unit and to the bearing unit provided with said sealing device. The sealing device and the bearing unit are preferably, but not exclusively, applied to a wheel hub assembly.

BRIEF DESCRIPTION OF THE DRAWINGS

Aspects of various exemplary embodiments will hereinafter be described in conjunction with the appended drawings, provided to illustrate and not to limit the disclosed aspects, wherein like designations denote like elements.

FIG. 2a is a detail of the wheel hub assembly of FIG. 1 in which there is a sealing device for a bearing unit according to a first exemplary embodiment in accordance with the present disclosure, housed between the rings of the bearing unit, FIG. 2b is a detail on an enlarged scale of a portion of the sealing device FIG. 2a, FIG. 3 is the same detail of the wheel hub assembly of FIG. 1, in which there is a sealing device for a bearing unit, in a second exemplary embodiment in accordance with the present disclosure, housed between the rings of the bearing unit.

DETAILED DESCRIPTION

Figure 1:
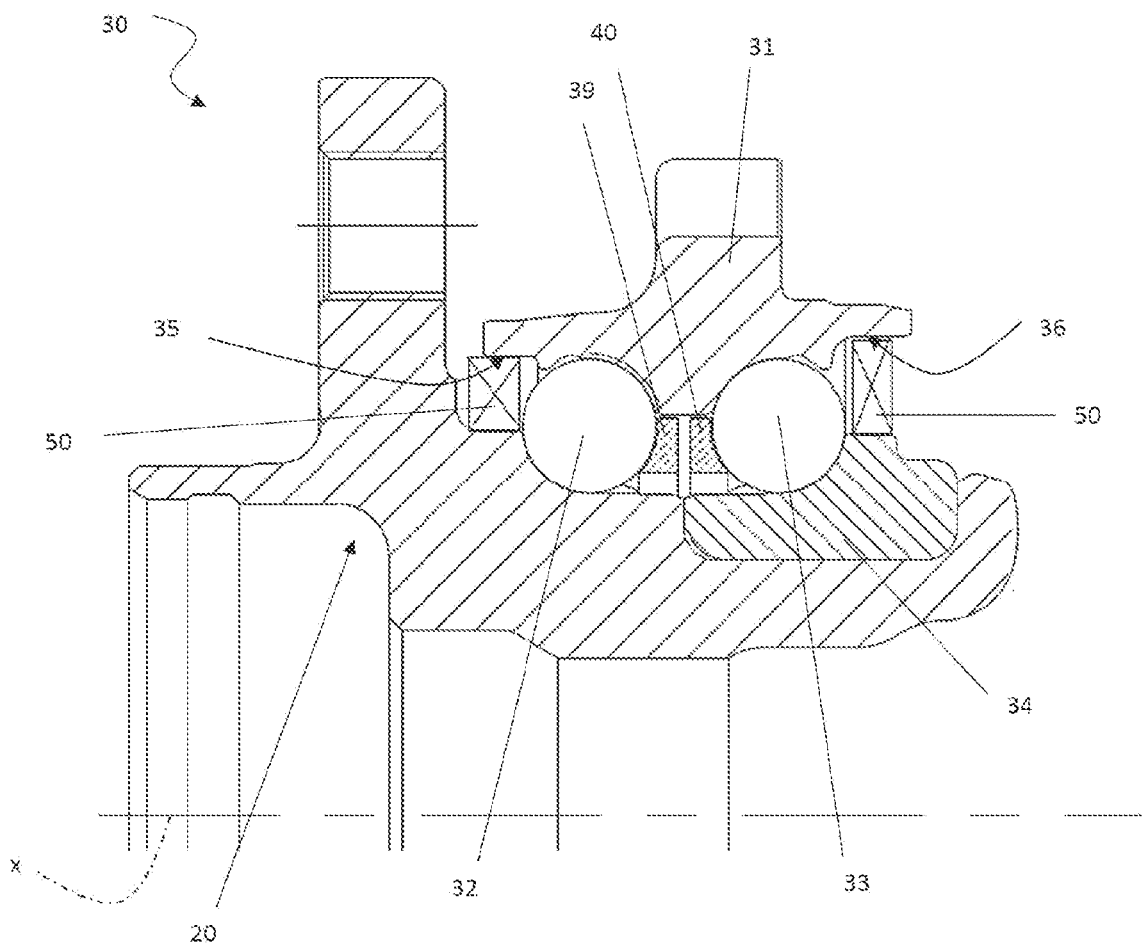
FIG. 1 is a cross section through a wheel hub assembly provided with a bearing unit.

Exemplary embodiments may be applied to all generations of wheel hub assemblies. In particular, such applications comprise both the case in which the outer ring of the bearing unit is rotatable while the inner rings of the bearing unit are fixed and the opposite case in which the inner rings rotate and the outer ring is fixed. Upon reading this disclosure in full, one will appreciate that embodiments are also suitable for any type of rolling bodies (balls, rollers, tapered rollers, etc.).

Sealing devices may be two-part cassette seals, comprising a rotatable portion, mounted, for example, on the radially inner ring of the bearing unit, and a stationary portion, mounted, for example, on the radially outer ring of the bearing unit. Also by way of example, the stationary portion comprises a metal screen interference-fitted on the radially outer ring, and an elastomer portion is co-moulded on to the metal screen. A second, rotatable, metal screen is interference-fitted on to the rotatable radially inner ring.

The stationary portion of elastomer material comprises one or more lips which contact the rotatable portion, and which provide a seal for the inside of the bearing unit.

Sealing means may consist of a single part, integral with one of the rings of the bearing unit, in which at least one contact lip provides a seal by the interference with a surface of the other ring of the bearing unit which is created when the seal is assembled.

The typical design of a sealing device therefore comprises one or more projections, called lips, which, having different shapes and orientations (typically axial and radial), are in contact with rotatable surfaces of the bearing unit: thus the sealing device prevents the entry of contaminants from the outside, protecting the internal components of the bearing unit, in other words the rolling bodies and the cages containing the rolling bodies themselves. Another important function of a sealing device is that of preventing the outflow of lubricants present inside the bearing unit.

A sliding friction force is created between these contact lips and the corresponding rotatable contact surfaces of the bearing unit, resulting in a dissipation of energy. As a rule, the sealing capacity increases with the number of contact lips and their rigidity. However, when there is an increase in these parameters there is also an increase in the amount of energy dissipation.

Furthermore, owing to the increase in global competition, customers or motor manufacturers are constantly demanding ongoing technical and economical improvements in wheel hub assemblies. In particular, the development of technology is accompanied by a demand for components that have low energy dissipation while also providing the same performance as cutting-edge solutions.

To overcome this technical problem, it would be ideal to have a contactless sealing device that would successfully prevent the entry of contaminants and the loss of lubricants without the dissipation of energy. A contactless sealing device does not operate correctly, especially in underwater environments.

A sealing device is provided having low energy dissipation but excellent sealing performance, which is free of the aforementioned drawbacks.

Purely by way of example and without limiting intent, exemplary embodiments will now be described with reference to a bearing unit 30, preferably a wheel hub assembly for motor vehicles provided with a bearing unit having a sealing device according to the present application.

With reference to FIG. 1, a bearing unit or wheel hub assembly is indicated as a whole by 30.

The unit has a central axis of rotation X, and includes a rotatable radially inner flanged ring 20, a stationary radially outer ring 31, a further rotatable radially inner ring 34 mounted on, and integral with the flanged ring 20, a plurality of rolling bodies 32, 33, in this example balls, interposed between the radially outer ring 31 and the flanged ring 20, two cages 39 and 40 for keeping the rolling bodies of the rings of rolling bodies 32, 33 in position.

Throughout the present disclosure and claims, terms and expressions indicating positions and orientations such as "radial" and "axial" are to be interpreted as relative to the central axis of rotation X of the bearing unit 30. On the other hand, expressions such as "axially outer" and "axially inner" relate to the assembled condition of the wheel hub assembly, and in the present case preferably relate to a wheel side and to a side opposite the wheel side, respectively.

The flanged ring 20 and the radially outer ring 31 define, between themselves and at the opposed axial ends of the bearing unit 30, two spaces 35, 36 which, if not screened, would allow contaminants and impurities to enter the bearing unit 30.

Therefore, in order to screen the bearing unit 30, at least one sealing device, e.g., 50, 60, 70, made in accordance with the present disclosure, is mounted inside at least one of the two spaces 35, 36.

Normally, the sealing devices 50 comprise two metal screens facing each other, at least one of which is provided with one or more sealing lips of elastomeric material in sliding contact with the other screen, or a single metal screen carrying one or more sealing lips of elastomeric material which slidingly contact a sliding surface of the bearing unit 30 in relative motion with respect to the seals themselves.

In the following text, with reference to FIG. 2a, an illustration will be given, according to an exemplary embodiment in accordance with this disclosure, of the case in which the sealing device 50 comprises a rotating part provided with a metal screen 1, interference-fitted on to the radially inner flanged ring 20, and a stationary part, which in turn comprises: a metal screen 10 interference-fitted on to a radially inner surface 31a of the radially outer ring 31, an elastomer coating 2, co-moulded on the first screen 10, the development of which is substantially radially internal and axially external with respect to said first screen 10, a radially inner contact lip 9, belonging to the elastomer coating 2 and therefore stationary, which makes a sliding contact with the rotatable second screen 1.

According to exemplary embodiments, the sealing device 50 is provided with an appendage 6 made of elastomer which faces the radially inner flanged ring 20 of the bearing unit 30 and acts as an external barrier against the entry of contaminants. In particular, according to this first embodiment, the appendage 6 is part of the elastomer coating 2 and constitutes the radially outer and axially inner portion thereof. The width of the meatus G1 which is formed between the radially and axially outer end of the appendage 6 and the radially inner flanged ring 20 may vary between 0 mm and 1.5 mm. In fact, since the appendage 6 is made of elastomer, it would not be a problem (except for a small dissipation of energy due to friction) if the meatus G1 were eliminated; what is important is that its size should be kept as small as possible, and therefore, given the tolerances on the components of the bearing unit, the maximum size is preferably limited to 1.5 mm. In order to eliminate even the small dissipation, in some embodiments the meatus of G1 is non-zero in length, e.g., at least about 0.1 mm.

Advantageously, the appendage 6 extends along an oblique direction lying at an angle of between 0° and 35° to the axis of rotation X of the bearing unit 30, and has a thickness of between 0.5 mm and 1 mm.

Additionally, the minimum diameter D1 of the point of attachment R of the root of the appendage 6 to the elastomer coating 2 advantageously has a minimum value of:

$$D1 = Di + 3/4 * (De - Di)$$

where De and Di are, respectively, the radially outer and radially inner diameters of the radially outer ring 31 radially outer of space 35 of the bearing unit 30.

Although not shown in the figure, the number of appendages 6 may also be equal to two. In this case, the second appendage will be in a radially outer position with respect to the first appendage 6, shown in FIG. 2. In particular, the second appendage will be positioned at a minimum radial distance of 2.5 mm from the first appendage 6.

With reference to FIG. 2b, the rotatable second metal screen 1 is preferably shaped practically in the form of a "C", with the radially outer limb 1' inclined at an angle α of more than 1° to the axial direction in the radially outward direction. An angle α is limited on an upper bound by ensuring that 1' does not interfere with seal Gr or cause limb 1' to interfere with elastomer coating 2 or lip 3 during operation.

Alternatively or additionally, the rotatable second metal screen 1 is shaped practically in the form of a "C" and the distance d between the end of the radially outer limb 1' and the elastomer coating 2 must be greater than 1 mm.

Advantageously, an elastomer coating 2 is provided with a radially inner lip 3 of small size, which does not make contact: the sealing device 50 is therefore provided with a first radial labyrinth seal Gr formed by the lip 3 that faces a radially outer limb of the metal screen 1.

Advantageously also, and with reference to FIG. 2b, the radially outer limb 1' of the screen 1 faces the elastomer coating 2 in an axial direction, and a second, axial, labyrinth seal Ga is also formed, this seal interacting with the radial labyrinth seal Gr to improve the efficiency of the barrier against external contaminants.

Figure 3:
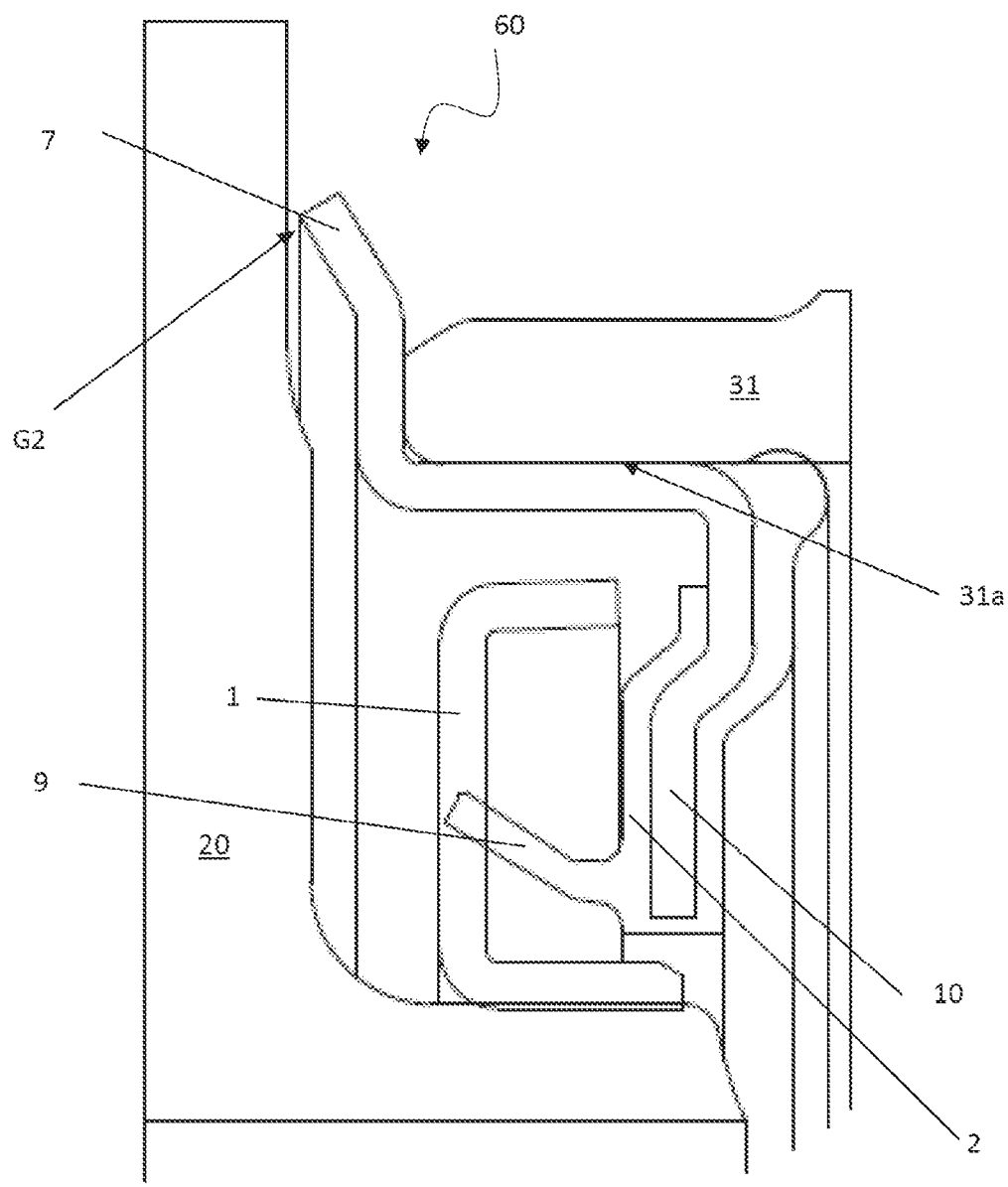

FIG. 3 shows another exemplary embodiment of the application, according to which a sealing device 60 comprises a rotating part provided with a metal screen 1, interference-fitted on to the radially inner flanged ring 20, and a stationary part, which in turn includes a metal screen 10 interference-fitted on to a radially inner surface 31a of the radially outer ring 31, an elastomer coating 2, co-moulded around the first screen 10, and a radially inner contact lip 9, belonging to the elastomer coating 2 and therefore stationary, which makes a sliding contact with the rotatable second screen 1.

According to one aspect, the sealing device 60 is provided with a metal appendage 7 which faces the radially inner flanged ring 20 of the bearing unit 30 and acts as an external barrier against the entry of contaminants. In particular, in like embodiments, an appendage 7 is part of the first screen 10 and constitutes the radially outer and axially outer portion thereof. The width of the meatus G2 which is formed between the radially and axially outer end of the appendage 7 and the radially inner flanged ring 20 may vary between 0.6 mm and 1.5 mm. In this solution, since the metal appendage 7 is made of metal, and given the constraint of keeping the size of a meatus G2 as small as possible (in this solution also, therefore, the maximum size is preferrably 1.5 mm), it is impossible to specify a limit case in which the width of the meatus is zero: if two metal parts were to come into contact, the appendage 7 would act as a tool on the surface of the flanged ring 20, causing unacceptable erosive wear. A minimum value of 0.6, or about 0.6, for the width of the meatus G2 provides a safeguard against erosive wear. Evidently, since the appendage is made of metal and not elastomer, it is possible to specify a range of tolerances (0.6-1.5 mm) for the meatus G2 that is smaller than the range of tolerances for the meatus G1 (0-1.5 mm).

Advantageously, the appendage 7 extends along an oblique direction lying at an angle of between 30° and 89°, to the axis of rotation X of the bearing unit 30, and has a thickness of between 0.5 mm and 1 mm.

Additionally, the minimum diameter D1 of the point of attachment R of the root of the appendage 7 to the first screen 10 advantageously has a minimum value of:

$$D1 = Di + 3/4 \times (De - Di)$$

where De and Di are, respectively, the radially outer and radially inner diameters of the radially outer ring 31 of the bearing unit 30.

Figure 4:
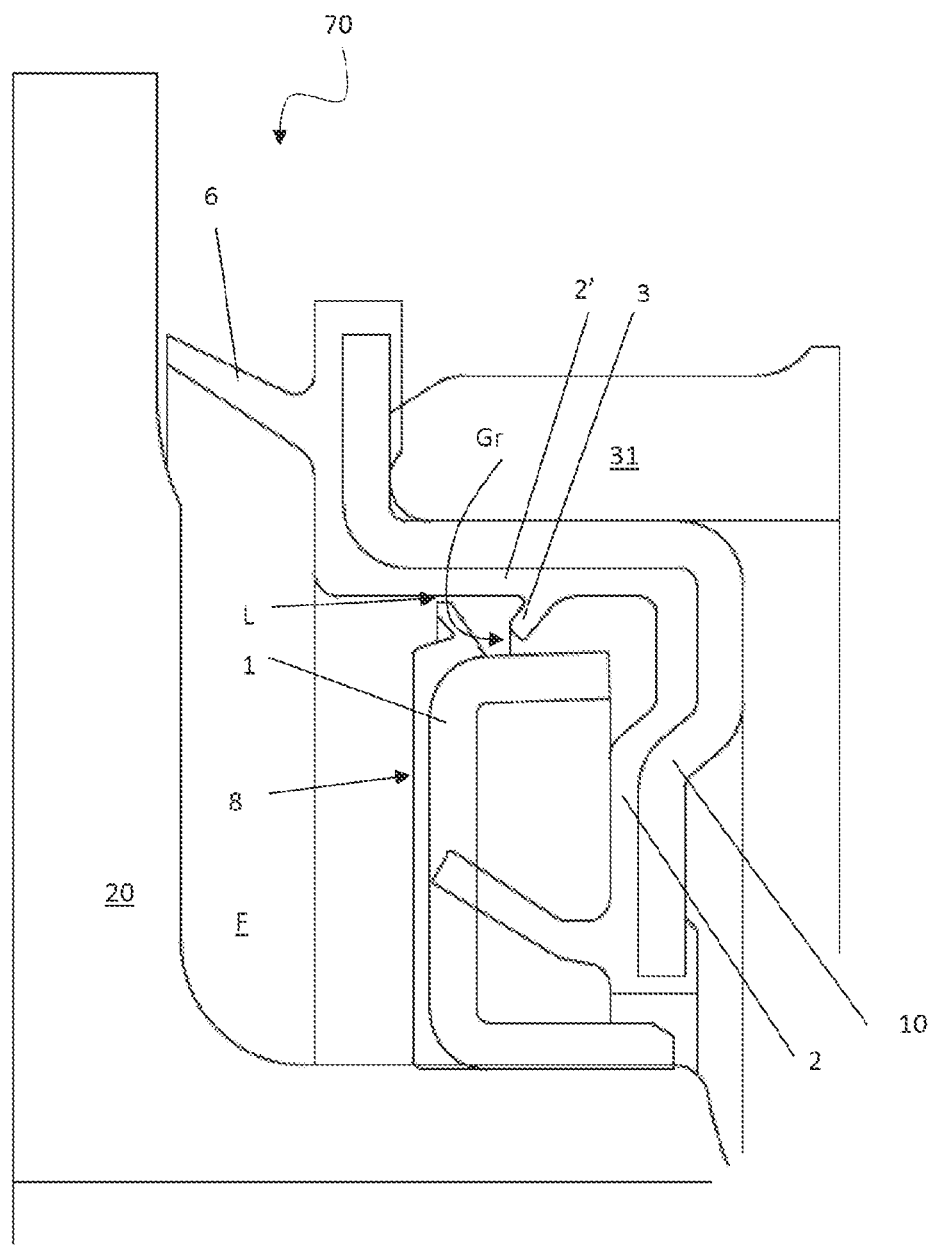
FIG. 4 is the same detail of the wheel hub assembly of FIG. 1, in which there is a sealing device for a bearing unit, in a third embodiment of the present application.

Another exemplary embodiment is illustrated in FIG. 4. The aforesaid figure shows a sealing device 70 which is similar overall to the sealing device 50 described and illustrated in FIG. 2. With respect to the sealing device 50, the sealing device 70 of FIG. 4 is provided with a further axially outer elastomer coating 8 co-moulded on to the core of the second metal screen 1, which, as stated, is shaped practically in the form of a "C". This further elastomer coating 8 has the purpose of creating a further barrier to contaminants. The radially outer end of the elastomer coating 8 is formed to create a labyrinth L with the cylindrical portion 2' of the elastomer coating 2. The labyrinth L substantially reduces the entry of contaminants. This reduction is reinforced by the radial labyrinth Gr, formed by the lip 3 facing the radially outer limb of the second screen 1.

It should be noted that, although not shown in the figure, this further elastomer coating 8 may also be formed for the sealing device 60 shown in FIG. 3. In the latter case, the labyrinth will be formed by the radially outer end of the elastomer coating 8 with the cylindrical portion of the first screen 10. The barrier against contaminants created by the further elastomer coating 8 is more effective because, when the metal appendage 7 is present, the size of the meatus G2 may be greater than that of the meatus G1 of the sealing devices 50, 70. In this last-mentioned case also, the non-contacting lip 3 is not present.

It should be noted that the radially outer end of the rotatable further elastomer coating 8 does not, and must not, contact the stationary elastomer coating 2. Otherwise a situation of relative sliding between two elastomer components would arise, resulting in very high energy dissipation due to friction. Conversely, if the further elastomer coating 8 defines the labyrinth L facing the first screen 10, there could be contact between these two components, since one is made of elastomer and the other of metal.

Additionally, the rotatable second screen 1 generates turbulence by centrifugal action, which helps to drain the contaminant into the pre-chamber F, formed between the flanged ring 20, the outer appendage 6, 7, and the further elastomer coating 8.

For the solution in FIG. 4, in the assembled condition the size of the meatus of the labyrinth L is between 0.1 mm and 1 mm: it should be noted that the two elastomer coatings 2, 8 must never come into contact.

For the solution with the labyrinth formed between the further elastomer coating 8 and the first screen 10, the size of the meatus of the labyrinth is between 0 mm and 1 mm in the assembled condition: in this case, the two components (the elastomer coatings 8 and the first screen) may come into contact.

Although not shown in FIGS. 2, 3, and 4, the sealing device 50, 60, 70 could have a non-axially symmetrical geometry: in other words, its components, including both the stationary and the rotatable parts, could have a circumferential development with a width of between 180° and 260°. Thus, by accurately assembling the bearing unit and the wheel hub assembly so that the sealing device has the solid portion of its components facing the top of the motor vehicle and is open towards the bottom of said motor vehicle, the sealing device is made to operate as a barrier against contaminant entering from the top of the motor vehicle, and allows these contaminants to flow out freely towards the bottom of the motor vehicle.

The insertion of the barrier or barriers, whether made of elastomer or metal, enables the rate of flow of the contaminant into the sealing device to be reduced, and therefore makes it possible to design thinner contact lips, thereby reducing the friction on the seal. At the same time, for applications not requiring reduced friction, this solution makes it possible to improve the performance of a sealing device having standard contact lips.

Exemplary embodiments define a cassette sealing device having at least one external barrier which faces a radially inner flanged ring of the bearing unit and has the function of better protecting the inside of the device and in particular the first operating dynamic sealing lip.

In fact, in order to obtain a significant reduction in friction, better protection is provided for the contact point of the sealing lip in order to enable thinner lips to be designed.

The external barrier may advantageously be made of either elastomer or metal. The external barrier is designed to reduce as far as possible the rate of flow of the contaminant that can reach the sealing area of the cassette. The width of the meatus between the barrier and the radially inner flanged ring of the bearing unit must be as small as possible, while allowing for the tolerances of the components of the bearing unit and the bending stresses during the operation of the bearing unit.

In exemplary embodiments, the sealing device and its housing inside the bearing unit are made so as to increase the internal volumes, so that the latter can form larger reservoirs for the accumulation and drainage of contaminants that succeed in passing through the aforesaid external barrier.

The insertion of the barrier and the reduction of the rate of flow of the contaminant into the sealing device make it possible to design thinner contact lips, thereby reducing the friction on the seal. At the same time, for applications not requiring reduced friction, this solution makes it possible to improve the performance of a sealing device having standard contact lips.

Exemplary embodiments also relate to a bearing unit, and particularly to a bearing unit for a wheel hub assembly provided with a sealing device according to one of the embodiments of the present application.

Further preferred and/or particularly advantageous embodiments of the invention are described according to the appended dependent claims.

In addition to the embodiments of the application as described above, it is to be understood that there are numerous other variants. It is also to be understood that these embodiments are provided solely by way of example and do not limit the object of the application or its possible configurations. On the contrary, although the description given above enables a person skilled in the art to implement the present application according to at least one example of its embodiment, it is to be understood that numerous variations of the components described are possible without departure from the object of the application as defined in the appended claims, which are interpreted literally and/or according to their legal equivalents.

The invention claimed is:

1. A sealing device for a bearing unit comprising:
   a stationary part comprising:
   a first metallic screen,
   an elastomer coating, co-moulded on the first metallic screen,
   a contacting lip, wherein the contacting lip is radially internal of the first metallic screen, wherein the elastomer coating comprises the contacting lip; and a rotatable part provided with a second metallic screen on which the contacting lip makes a sliding contact;

wherein the stationary part further comprises at least one appendage extending towards a flanged portion of the rotatable part and cooperates with the flanged portion to create a barrier against the entry of contaminants within the sealing device;

wherein the at least one appendage is made of an elastomer, wherein the at least one appendage is part of the elastomer coating, and wherein the at least one appendage comprises a radially outer and axially outer portion of the elastomer coating;

wherein the at least one appendage comprises two appendages radially spaced by at least 2.5 mm.

2. The sealing device of claim 1, wherein the width of a meatus (G1) which forms between the radially outer and axially outer end of the appendage and the flanged ring is between 0 mm and 1.5 mm.

3. The sealing device of claim 1, wherein the width of a meatus (G1) which forms between the radially outer and axially outer end of the appendage and the flanged ring is about 0.1 mm.

4. The sealing device of claim 1, wherein the at least one appendage is made of metal, wherein the at least one appendage is part of the first metallic screen and comprises the radially outer and axially outer portion of the first metallic screen.

5. The sealing device of claim 4, wherein the width of a meatus (G2) which forms between the radially outer and axially outer end of the appendage and the flanged ring between 0.6 mm and 1.5 mm.

6. The sealing device of claim 1, further comprising an additional elastomer coating co-moulded on the second screen.

7. A bearing unit equipped with the sealing device of claim 1, housed in a cavity, the bearing unit further comprising:
- a flanged radially inner ring, wherein the flanged radially inner ring is rotatable,
- a radially outer ring, wherein the radially outer ring is stationary
- an additional radially inner ring, rotatable, mounted on, and integral with the flanged radially inner ring,
- a plurality of rolling bodies interposed between the radially outer ring and the radially inner rings.

8. A sealing device for a bearing unit comprising:
a stationary part comprising:
 a first metallic screen,
 an elastomer coating, co-moulded on the first metallic screen,
 a contacting lip, wherein the contacting lip is radially internal of the first metallic screen, wherein the elastomer coating comprises the contacting lip; and
a rotatable part provided with a second metallic screen on which the contacting lip makes a sliding contact;
wherein the stationary part further comprises at least one appendage extending towards a flanged portion of the rotatable part and cooperates with the flanged portion to create a barrier against the entry of contaminants within the sealing device;
 wherein a radially outer end of the additional elastomer coating extends radially towards a cylindrical portion of the elastomer coating defining a distance between 0.1 mm and 1 mm.

9. A sealing device for a bearing unit comprising:
a stationary part comprising:
 a first metallic screen,
 an elastomer coating, co-moulded on the first metallic screen,
 a contacting lip, wherein the contacting lip is radially internal of the first metallic screen, wherein the elastomer coating comprises the contacting lip; and
a rotatable part provided with a second metallic screen on which the contacting lip makes a sliding contact;
wherein the stationary part further comprises at least one appendage extending towards a flanged portion of the rotatable part and cooperates with the flanged portion to create a barrier against the entry of contaminants within the sealing device;
 wherein a radially external end of the additional elastomer coating faces a cylindrical portion of the first screen at a distance between 0 mm and 1 mm.

10. A sealing device for a bearing unit comprising:
a stationary part comprising:
 a first metallic screen,
 an elastomer coating, co-moulded on the first metallic screen,
 a contacting lip, wherein the contacting lip is radially internal of the first metallic screen, wherein the elastomer coating comprises the contacting lip; and
a rotatable part provided with a second metallic screen on which the contacting lip makes a sliding contact;
wherein the stationary part further comprises at least one appendage extending towards a flanged portion of the rotatable part and cooperates with the flanged portion to create a barrier against the entry of contaminants within the sealing device;
further comprising a radially inner lip extending from the elastomer coating in a direction radially inward and axially towards a flange extending radially from the stationary part defining a meatus (Gr) between an axially inner end of the radially inner lip and a radially outer limb of the second metal screen.

* * * * *